(12) United States Patent
Karapetyan et al.

(10) Patent No.: US 10,702,006 B1
(45) Date of Patent: Jul. 7, 2020

(54) DEVICE FOR BABY WALKING AND BALANCING ASSISTANCE

(71) Applicants: Sophia Karapetyan, Los Angeles, CA (US); Armen Karapetyan, Los Angeles, CA (US)

(72) Inventors: Sophia Karapetyan, Los Angeles, CA (US); Armen Karapetyan, Los Angeles, CA (US)

( * ) Notice: Subject to any disclaimer, the term of this patent is extended or adjusted under 35 U.S.C. 154(b) by 263 days.

(21) Appl. No.: 15/932,887

(22) Filed: May 15, 2018

(51) Int. Cl.
*G09B 19/00* (2006.01)
*A43B 3/30* (2006.01)
*A43B 13/14* (2006.01)
*A43B 23/02* (2006.01)

(52) U.S. Cl.
CPC ............... *A43B 3/30* (2013.01); *A43B 13/14* (2013.01); *A43B 23/0245* (2013.01); *G09B 19/003* (2013.01)

(58) Field of Classification Search
USPC ............... 434/247, 255, 258; 36/1, 103, 112
See application file for complete search history.

(56) References Cited

U.S. PATENT DOCUMENTS

| | | | | | |
|---|---|---|---|---|---|
| 2,724,193 | A | * | 11/1955 | McDermott | A43B 3/16 36/1 |
| 2,761,223 | A | * | 9/1956 | Legeai | A47D 13/04 434/255 |
| 3,463,164 | A | * | 8/1969 | Matles | A43B 3/30 36/142 |
| 3,713,437 | A | * | 1/1973 | Wiedmer | A61F 5/0116 601/27 |
| 4,584,782 | A | * | 4/1986 | Thatcher | A43B 3/126 36/11.5 |
| 5,228,216 | A | * | 7/1993 | Sargeant | A43B 3/126 36/11.5 |
| 5,266,062 | A | * | 11/1993 | Runckel | A63B 31/11 36/8.1 |
| 6,457,976 | B1 | * | 10/2002 | Fleshman | A43B 3/30 36/103 |
| 7,500,324 | B1 | * | 3/2009 | Power | A43B 13/145 36/132 |
| 7,784,198 | B2 | * | 8/2010 | Roudebush | A43B 3/30 36/112 |
| 7,955,230 | B1 | * | 6/2011 | Al-Oboudi | A61H 1/0266 482/139 |
| 8,578,633 | B2 | * | 11/2013 | Roether | A43B 13/026 36/100 |
| 9,565,892 | B2 | * | 2/2017 | Spector | A43C 19/00 |
| 9,596,904 | B2 | * | 3/2017 | Bishop | A43B 23/0245 |
| 10,258,103 | B2 | * | 4/2019 | Levinson | A43B 5/08 |
| 2005/0150135 | A1 | * | 7/2005 | Kelley | A43B 13/14 36/103 |
| 2008/0244932 | A1 | * | 10/2008 | Nau | A43B 3/0036 36/102 |
| 2009/0183393 | A1 | * | 7/2009 | Lee | A43B 13/10 36/103 |
| 2016/0050978 | A1 | * | 2/2016 | Ozturk | A41B 11/007 36/103 |

* cited by examiner

Primary Examiner — Kurt Fernstrom (57) ABSTRACT

A device for baby walking and balancing assistance provides the baby's faster learning of the baby walking, balancing and motor coordination. The device for baby walking and balancing assistance includes the left and right portions each comprising the baseplate and shoe or supporting strips to receive the baby's feet.

2 Claims, 6 Drawing Sheets

DEVICE FOR BABY WALKING AND BALANCING ASSISTANCE

FIELD OF INVENTION

The invention relates to the devices for baby walking and balancing assistance. More specifically, invention relates to the supplemental devices providing a baby with the walking, balancing and motor coordination aid.

BACKGROUND OF INVENTION

Some baby walking and balancing assistance devices mostly require the adult assistance and the child (baby, infant) holds on to appropriate part of the walking training (learning) device. For instance, such devices are described in the U.S. Pat. Nos.: 1,332,461; 2,108,566; 2,545,009; 2,956,616; 3,237,939; 6,196,949 and 9,314,114.

For example, the U.S. Pat. No. 6,196,949 describes the apparatus for assisting and training a child (baby, infant) to walk. This apparatus includes a frame with a top. The frame is generally U-shaped at the top. The top has two ends with two frame vertical angled elements (called in the patent as the leg elements), wherein each frame vertical angled element has an elongated and vertical top end element and a lower portion. The top end element of each frame vertical angled element is attached to an end of the top of the frame. The two frame vertical angled elements are each generally J-shaped and padded along the lower portions of the frame vertical angled elements. The generally J-shaped frame vertical angled elements are parallel to each other. Each J-shaped frame vertical angled element comprises a separate elongated and generally vertical top end element with a top and a bottom and a corresponding separate generally horizontal curved bottom end element. The frame, comprising the top and frame vertical angled elements, is made of a rigid light-weight material, such as aluminum or steel tubing, plastic or wood, and padding, to the exterior of lower portions is made of a flexible, yet durable impact-absorbing material, such as polystyrene-type foam. The adult operator, who is in a generally upright, standing, erect or walking position, holds the frame by a handle or grip, which handle or grip is attached to top. The operator manually suspends the frame over a floor or travelling surface at an elevation convenient to the child's training to walk. The child is standing in a generally erect position. As the frame is suspended over the child, the frame vertical angled elements are to either side of the child at approximately the level of the elbow of the child. The forearm and/or upper arm, where the upper arm joins the torso of the child, rests upon lower portions, which are generally horizontal components of the J-shaped frame vertical angled elements. The lop end element of the frame vertical angled element is positioned to be within the grasp of the child. The suspended frame defines a space which the child occupies while using this apparatus to permit movement of the child's upper torso and head within the space defined by the apparatus. The top of the frame is suspended in a position vertically superior to the body and the head of the child. The upper body of the child is generally positioned within the space defined by the frame, and the child's forearms and elbows extend to, or over, the surface of the lower portions of frame vertical angled elements. The child grips the elongated and generally vertical top end element with his hands and otherwise supports himself with his or her forearms and upper arms by leaning on the lower portion of frame vertical angled elements. In using this walking and training apparatus, the infant initially employs his or her upper body strength to support himself within the frame. As the infant's legs, muscles and bones develop and become stronger and the child learns to walk and improves his or her own standing and ambulatory skills, the apparatus becomes less a suspension or a support means than a stabilizing means for the training child until the child is able enough to walk unattended or unassisted.

The rigid frame extends around the body of the child. The operator is able to maintain a preferred generally erect position while walking or standing. The frame can be suspended by more than one operator while a child is learning to walk.

The separate generally horizontal curved bottom end element has a front end and a rear end. The front end of the corresponding separate generally horizontal curved bottom end element of each J-shaped frame vertical angled element is pivotally attached, by an attachment means (hinge or pin), to the bottom of elongated and generally vertical top end element. Each separate generally horizontal curved bottom end element folds into the elongated and generally vertical top end element of each J-shaped frame vertical angled element. The elongated top end element of each J-shaped frame vertical angled element can be extensible. The apparatus also can include a first shaft, which works in union with a movable second shaft, which fits into and moves within the first shaft; a fastener, which secures the first shaft and the second shaft together to adjust the length of the elongated top end element of each J-shaped frame vertical angled element; the extension members, slidable into the elongated and generally vertical top end element; wheels; and first and second engagement portions.

Such apparatus is not safe for baby considering that baby walking training should be conducted on the soft surface only, because baby at any time can stop to hold the apparatus and fall down.

Another mentioned hereinabove U.S. Pat. No. 9,314,114 describes the device for assisted walking. The described device comprises a top section, including a plurality of sides and a flat rectangular top surface. The sides of the top section supported within a side support. The top section has a first perimeter defined by a plurality of raised borders on each side of the top section. The raised borders form an upper portion of a corresponding side support. The side supports provide structural support to the device and formed to receive the top section. The device also comprises a plurality of support legs. Each of the support legs is connected to two of the side supports at a proximal end by an interference fit or by fasteners (e.g., bolts, nails, or screws). Each of the support legs extends orthogonally away from the top section and the side supports, toward a device's floor. The top section is of a rectangular or square shape with each of the support legs being disposed at the corners of the top section. Each support leg is formed to join with two adjacent side supports and with the top section. The device also comprises a plurality of feet affixed or otherwise formed to a distal end of the support legs. The feet are in direct contact with the device's floor. The feet are of a rounded shape and provide a surface that may slide along the floor when a force is applied to one of the sides of the device. Each side of the top has an equal top dimension. The device has a base perimeter. The base perimeter is proportional to the top perimeter. The base dimensions are larger than the top dimensions, providing a side profile having an overall "trapezoidal" shape. The support legs have an upper portion and a lower portion. The upper portion have a hollow construction and an internal space sized to receive the lower portion with a clearance fit.

The upper portion is formed with a series of adjustment holes sized to accept a quick release button. The device includes brackets, gaskets, and many different form and size secondary fasteners.

Such apparatus is not safe for baby either considering that the baby's torso or face can hit the top of the device.

The U.S. Pat. No. 5,120,287 describes the infant walking aid, where the infant is contained in the harness mechanism (which is represented by the set of straps for infant's support) during a walking training, and the adult operator maintains firm control of the child walking activity. The walking aid comprises harness mechanism for enclosing and supporting the infant therein. Harness mechanism includes an interior envelope within which the infant is partially located. Harness mechanism extends in vertical direction and provides an open framework for maintaining a body portion of the infant within the interior envelope. The infant's leg portions pass external to the interior envelope, formed by set of straps, defined as strap members. The first bar member is secured to an upper section of harness mechanism. First bar member is adapted to be grasped by an adult operator throughout its extended length in the transverse direction when taken with respect to vertical direction. First bar member is fixedly coupled to harness mechanism on opposing transversely displaced ends. Harness mechanism also includes a pair of flexible strap members which are secured to first bar member. The flexible strap members extend in vertical direction and are joined each to the other at apex section of harness mechanism defining a lower section of harness mechanism. Each of flexible strap members extends continuously from one of the opposing transverse ends of first bar member to the other opposing transverse end of first bar member. First strap members are formed in a loop around the opposing transversely opposed ends of first bar member or otherwise joined thereto in a fixed manner. Straps are stapled, or otherwise fixedly secured to first bar member. Flexible strap members can cross over each other or otherwise lie contiguous each to the other at apex section of harness mechanism. Flexible strap members are secured each to the other at apex section by sewing. Generally, flexible strap members are formed of a textile or plastic composition or may composition. Harness mechanism additionally includes waist strap member joined to flexible strap members at intersecting points. Waist strap member is adapted to encircle a waist portion of the infant. Waist strap member is formed in a continuous closed loop formation about the waist portion of the infant to maintain the infant within the interior envelope defined by flexible strap members. The infant or toddler will be releasably captured within the interior envelope defined by the flexible strap members. Waist strap member is fixedly secured to flexible strap members through sewing or some like technique to provide support for the infant contained therein. The second bar member is adapted to be grasped by the infant. Second bar member is displaceable from the internal envelope defined by the harness mechanism and extends outwardly to be displaced at the discretion of the infant. Displacement of second bar member by the infant provides additional support and allows the infant to aid in his or her own training. The infant grasps second bar member throughout the training exercise to provide support. When the infant becomes more adept at a walking exercise, second bar member can be less used. The displacement of second bar member from the interior envelope defined by harness mechanism is a variable and allows the infant to adjust for the changing center of gravity during any particular walking exercise. Second bar member is flexibly secured to the upper section of harness mechanism. Second bar member extends in transverse direction similar to the direction extension of first bar member. Second bar member straps are secured to opposing transverse ends of second bar member and are attached themselves on opposing ends to respective straps of harness mechanism. Second bar member strap members are sewed or otherwise fixedly joined to flexible strap members. Second bar member thus provides a grip for the infant and provides the infant a sense of balance and security.

Such infant walking aids, supporting infant by the straps, are not always conveniently fit the different size infants within the straps, and the edges of straps even can injure the infant's legs (body).

The baby walker with safety track by U.S. Pat. No. 5,050,504 includes a track means. The walker can be located outside the circular track or inside circular track. The location of the walker with respect to the track is optional inasmuch as the tracking casters are interchangeable with non-tracking casters (dictionary definition of "caster" is: a wheel or set of wheels mounted in a frame free to swivel about an axis perpendicular to the axis of the wheel or set of wheels and useful for supporting various items). The tracking casters can be put on either the right side of the walker or on the left side as for walker to permit the child to proceed in either clockwise or counterclockwise manner on either the inside or the outside of any particular track layout, as may be desired. The upper portion of baby walker is equipped with restraining straps or slings to go under the baby's bottom or other such restraining or support portions ("means" in the invention), supported by tubular posts or legs, which fit over corresponding vertical posts in sliding relation thereto. The posts are mounted on a lower frame. Inner posts comprise grooves for height adjustment of the upper portion according to size and growth to accommodate a particular child employing the walker. The lock mechanism has a latch lever with a lock knob which fits into grooves to maintain any set height of upper portion. The lever is held in place in locked position by restraining means. By forcing lever to the left with relation to the front post, or by twisting restraining means to the right, lever can be cleared out or withdrawn through openings, so that the upper portion can be raised or lowered and latched into a different height position. The slot in outer posts limits the vertical movement of outer posts with respect to inner posts so that upper portion cannot be removed completely without removing screws secured to inner posts through the slut. The units can be considered to comprise dual-wheel track lock-on casters as can wheeled assemblies on the other side of the walker, which units can or cannot be identical to the tracking casters. The track lock-on caster units comprises track lock on mechanisms. Caster bearing bosses are located on each corners of lower frame and have caster pins mounted therein for receiving wheel assemblies on the one side, which may also be dual-wheel casters, but which are not necessarily such and which are not necessarily track lock-on casters. Caster pins are removable or non-removable from their apertures. Each front and rear tracking casters includes wheels with axles mounted through central bodies, each having a pair of plates held together by screws and spaced apart by sleeves and stop-block. The track lock-on means are located between plates comprising a pair of track lock-on levers having at their lower extremities track lock-on hooks for locking under the protuberance, upwardly-extending T-shaped protuberance, which is located centrally of the track, thereby permitting dual wheels to ride upon the outwardly-extending platform or relatively flat portion of the track. The rear caster is reversed that the wheels are ahead of the pivot pin, so that the locking means clears the lower frame. Track lock-on levers have finger- or hand-grip ends which are spring-biased outwardly by spring or biasing means such as elastic, elastomeric or alike, and limited in the extent of their outward bias by stop-block so that track lock-on hooks at the lower extremities of levers are held in spaced relation to the track and to T-shaped protuberance thereof to permit ready movement of the tracking casters along track. Lock-on levers have an inward projection which limits the outward travel of the lower lock-on hooks thereof by such projection coming into contact with the top of stop-block. On rearward tracking caster, rearward plate has an aperture drilled therein for receiving flexible tail, so that the tail fits tightly into aperture and is secured therein by the enlarged end thereof on the other side of plate on forward tracking caster, head portion of which is attached to one of the plates by a joint, as are central bodies of casters securely fixed in place by a screw or glue. The female end of the track section with convex detent knob and upwardly-extending T-shaped protuberance. The male end of the complementary track section, having concave depression for convenient, is bin the secured connection of track sections into a track layout. The track can upwardly-extend protuberance in the form of a rod-like or continuous neck- and head-shaped member when viewed in cross section with lock-on levers having track lock-on hooks at the lower extremities thereof.

Such baby walkers are complex, require laborious assembly work, and even can be dangerous for infants, because they may lead the baby to the head spinning effect.

The U.S. Pat. No. 5,433,682 describes the infant exerciser and activity center. The center includes an oval tray, which is arranged in a substantially horizontal orientation relative to a stationary base having a circular shape. The tray is supported by a mounting post assemble, which extends from the center of the base to an inner peripheral portion of the tray. The mounting post assembly supports the tray such that its inner peripheral portion is maintained at an adjustable predetermined height above the base and such that the tray is revolvable in a circular path about a vertical axis, which is substantially coincident with a central axis of the base. The mounting post assembly includes a tubular socket, which extends upwardly from the base so as to rotatably receive a lower end of a tubular post. The socket includes an inner flange, which supports the lower end of the post within the socket. An annular cap rests atop the socket and circumscribes the post. An upper end of the post extends into a sleeve, which depends from the inner peripheral portion of the tray and which receives the upper end of the post. The upper end of the post is provided with aligned hole; while the sleeve is provided with aligned holes. A threaded bolt extends through the aligned holes and cooperates with a nut to releasably attach the post to the sleeve and to prevent the post from rotating relative to the sleeve. Tray is also provided with mounting legs, which depend from outer peripheral portions respectively. The mounting legs support the outer peripheral portions, respectively, of the tray such that they are maintained at the same height as the inner peripheral portion of the tray, whereby the tray is maintained in a horizontal orientation over a portion of the base.

The mounting leg includes a sleeve, which depends from the outer peripheral portion of the tray and which receives an upper end of a post. A lower end of the post is provided with a roller ball, which is rotatably mounted in the lower end of the post by a pin and which is in rolling engagement with the base. The upper end of the post is provided with aligned holes; while the sleeve is provided with the other aligned holes adapted for alignment with the first one. A threaded bolt extends through the aligned holes and cooperates with a nut to releasably attach the post to the sleeve and to prevent the post from rotating relative to the sleeve.

Also, the mounting leg includes a sleeve, which depends from the outer peripheral portion of the tray and which receives an upper end of a post. Each lower end of the post is provided with a roller ball, which is rotatably mounted in the lower end of the post by a pin and which is in rolling engagement with the base. The tray, which has a determinate circumferential length measured between ends thereof, is also provided with an opening intermediate the ends. The opening has a size and shape selected so as to accommodate a seat assembly, which is adapted to support an infant for rotation about a vertical axis passing through the center of the opening and positioned between the vertical axis and an outer edge of the base. The seat assembly includes a frame, having an annular skirt, which extends above the tray and which circumscribes the opening. The seat assembly also includes a fabric seat mounted on the frame and adapted to permit an infant to sit thereon. An annular roller bearing race is positioned between the tray and the skirt of the frame so as to support the seat assembly such that the seat assembly can freely rotate about the axis, whereby an infant in the seat can spin about the axis. The tray includes depressions to hold objects, such as toys, etc. Also the seat includes a belt or strap adapted to permit the height of the seat to be adjusted to accommodate different size infants. An infant is placed in the seat of the seat assembly. The infant is then free to exercise or walk in an arcuate path along the base, which remains stationary because it is immovably positioned on a floor or some other suitable support surface. As the infant walks or otherwise exercises, he or she can also rotate (i.e., spin) the seat assembly in a complete a circle (full 360° spinning in either a clockwise direction of a counterclockwise direction) or a partial circle.

Such infant exerciser and activity centers are complex, require laborious assembly work, significantly limits the infant's walking ability, and even can be dangerous for infants, because they may lead the infant to the head spinning effect by multiple 360° rotations during infant unsupervised activity.

The apparatus for supporting a small baby is presented by the U.S. Pat. No. 5,522,782. The main portions of the apparatus are a frame, having vertically extending corner posts and horizontal rails therebetween and a child seat. The frame comprises the vertically extending corner posts, upper horizontal rails and lower horizontal rails coupled between the corner posts in a rectangular configuration. The stability is provided through the use of a rectangular base coupled to the corner posts beneath the horizontal rails at the lower extents of the vertical corner posts. The support plate has long longitudinal edges which are parallel with each other and with a short parallel side edges. The edges are configured in a rectangular configuration. A hole is centrally located within the support plate, and a child seat is positioned within the hole. The seat is centrally positioned within the hole and is provided with the rigid circular support at its upper extent. The support has a horizontal recess in a circular configuration facing outwardly. The child seat includes a hemi-spherical supporting web having an upper annular edge which is coupled to and extends downwardly from the circular support member. The supporting web includes a pair of leg apertures directed therethrough permitting projection of legs of an individual through the supporting web when an individual such as a child is positioned therein. Linear bearing surfaces are provided for the sliding motion of the plate with respect to the frame.

Such linear bearing surfaces include horizontal slots on facing surfaces of the upper horizontal rails in cooperation with the lateral edges of the support plate. Such lateral edges of the support plate are received within the slots, allowing smooth sliding movement of the plate with respect to the frame. A lubricous hearing surface as of Teflon or the like may be provided in the recess or the lateral edges of the support plate or on both to further facilitate the sliding motion therebetween addition to the linear bearing surfaces. The circular bearing surface is also provided in addition to the linear bearing surfaces. The circular bearing surface is formed between the inner edge of the hole and the outer edge of the seat. Both such components of the bearing surfaces being circular of an essentially common diameter, this will allow the smooth rotational movement of the seat and child therein with respect to the plate and frame. The apparatus also includes the releasable coupling components, such as pins and recesses, etc., and the track which is located on the inner surface of the top lateral members. This track supports a rectangular seat and allows it to travel along the length of the frame.

Such infant walking apparatus require laborious assembly work, and significantly limits the infant's walking ability and even can be dangerous for infants, because they may lead the infant to the head spinning effect by multiple 360° rotations during infant unsupervised activity.

The U.S. Pat. No. 6,012,731 describes the baby walker comprising a seat holder supported on a wheeled base, a ball bearing mounted on the seat holder, a rotary carrier supported on the ball bearing, and a seat supported on the rotary carrier. The scat holder comprises an inner flange around the inner diameter thereof, two endless upright flanges concentrically raised from the top side wall thereof around the inner flange, a top annular groove defined between the inner flange and the inner endless upright flange, a plurality of pin holes equiangularly spaced in the top annular groove through the top side wall, a latch holder provided inside the-outer endless upright flange, and a latch moved in and out of the latch holder. The ball bearing is mounted within the annular groove at the seat holder, comprised of two annular races connected in parallel, and a plurality of steel balls retained between the annular races. The races each comprise a plurality of equiangularly spaced ball holes of diameter smaller than the steel balls, a plurality of equiangularly locating pins, and a plurality of equiangularly spaced pin holes. The races are connected together (by plugging the locating pins at one race into the pin holes) in order to hold the steel balls in the ball holes between the races. When assembled, the steel balls peripherally project out of the ball holes at the races.

The rotary carrier comprises an annular base, an inner vertical endless flange, raised from the bottom side wall of the annular base around the inner diameter thereof, an outer vertical endless flange raised from the bottom side wall of the annular bass and spaced around the inner vertical endless flange, a bottom annular groove, defined between the inner vertical endless flange and the outer vertical endless flange which receives the ball bearing, a plurality of springy hooks spaced around the inner vertical endless flange and respectively hooked on the bottom edge of the inner flange of the seat holder, a plurality of pin holes equiangularly spaced at the annular base for the positioning of the seat, and a retaining holes at the outer vertical endless flange for engagement with the latch at the seat holder. After installation of the rotary carrier and the ball bearing in the seat holder, the bottom edge of the outer vertical endless flange of the rotary carrier is disposed in contact with the top side wall of the seat holder. The bottom side wall of the annular base of the rotary carrier is supported on the inner endless upright flange of the seat holder, and the ball hearing is received in the top annular groove at the seat holder and the bottom annular groove at the rotary carrier. The seat comprises a plurality of positioning pins respectively plugged into the pin holes at the rotary carrier.

Such baby walkers are complex, expensive and require laborious assembly work.

The analogous complex and expensive configuration has the locking mechanism for swivel seat of baby walker by U.S. Pat. No. 6,386,563. This mechanism includes a stationary tray, a swivel mechanism, a seat, a circular base, a plurality of legs, and a lock member. The seat rests on tray, which comprises a central circular opening, an annular groove around opening with a plurality of steel balls slidingly and rotatably disposed therein, a plurality of recesses on the underside of tray, a toy area, and a flat area for retaining food, beverage, or the like. Swivel mechanism is a ring like member and consists of an upper member and a lower member. Upper member is sized to conform to circular opening. An annular ridge is provided on upper member inserted into annular groove of tray such that upper member may turn freely about balls on tray. A plurality of slots are provided on the inner periphery of upper member. A plurality of threaded holes are provided on the top surface of upper member. A plurality of dents are provided on the outer surface of upper member. Lock member on tray is engaged with one of the dents so as to secure seat to the tray. Lower member is also shaped to conform to circular opening and comprises an annular flange having an outer diameter slightly smaller than the diameter of the circular opening. A plurality of tabs are provided around the top surface of flange of lower member. Lower member is inserted from below and into the circular opening with tabs snapped into slots for securing lower member and upper member together. As a result, swivel mechanism may turn freely about the circular opening of tray. Seat 30 is adapted to receive an infant and comprises an annular frame and a fabric portion. A plurality of holes are provided around the top surface of frame such that a plurality of screws may drive through the holes and threaded holes to secure seat to the upper member. An infant can sit on the fabric portion on the bottom of seat. Fabric portion is stitched to the periphery of frame. Two leg openings are formed on the fabric portion of seat such that infant can extend its legs therethrough. The base comprises a plurality of upward sockets, and the legs are intercoupled the sockets and the recesses respectively. The tray is supported at a predetermined height above the base. The lock member is provided on the top surface of tray. Lock member is substantially an elongate bar and comprises two opposite indentation on the shank and an elastic member anchored on a portion of the recessed part on the shank. Two opposite holes are provided in tray, each of which is intended for receiving an elastic member and a steel ball (i.e., depressible spring detent). After that, the lock member can be configured in a retained, free, or locked state. When lock member is pulled to cause balls to move into indentations by the expansion of elastic members, elastic member is compressed in the recessed part of lock member within tray, and the lock member is in the retained state in this position. When lock member is pushed to engage with upper member for causing indentations to disengage from balls, elastic members are compressed and elastic member is expanded. At this position, lock member is in the free state. When swivel mechanism is rotated until one of dents is aligned with the inner end of lock member, elastic member is expanded to bias the inner end of lock member to move into engagement with the appropriate dent. At this position, lock member is in the locked state.

Such baby walkers are complex, expensive and require laborious assembly work.

Another infant walker is described in the U.S. Pat. No. 7,097,599. This walker includes a base assembly, shaft assembly, pivot arm and seat assembly, wherein shaft assembly extends perpendicularly from base assembly, and wherein a pivot arm and seat assembly are in rotary communication with shaft assembly. The base assembly possesses a circular-shaped disk-like platform, wherein platform possesses first platform member and second platform member, and wherein first platform member and second platform member are semi-circular-shaped and interlockingly engage to form platform. The first platform member possesses lower portion, middle portion and upper portion, wherein middle portion is positioned between lower portion and upper portion, and wherein lower portion, middle portion and upper portion are semi-circular-shaped. The middle portion possesses cutaway formed along edge of middle portion, wherein cutaway is generally semi-circular-shaped to enable accommodation of shaft assembly therein. Similarly, upper portion preferably possesses cutaway formed along edge of upper portion, wherein cutaway is generally semi-circular-shaped to enable accommodation of shaft assembly therein, and wherein cutaway of upper portion possesses a smaller diameter than cutaway of middle portion for assistance in anchoring shaft assembly therein. As a result of respective cutaways, the edge of middle portion possesses ends, and edge of upper portion possesses ends, wherein ends of edge of upper portion are p flush with edge of lower portion. End of edge of middle portion is recessed within upper portion and lower portion. End of edge of middle portion slightly outwardly protrudes beyond upper portion and lower portion.

The first set of throughholes is formed on upper portion, proximal to end of upper portion and extending radially from cutaway. The second set of throughholes is also formed on upper portion, proximal to another end of upper portion and extending radially from cutaway. All throughholes function to secure shaft assembly to platform of base assembly. The lower portion, middle portion and upper portion can be integrally formed together or formed separately and then secured to one another via any suitable securing means.

Such infant walkers are complex, expensive, require laborious assembly work, and significantly limits the infant's walking ability and even can be dangerous for infants, because they may lead the infant to the head spinning effect by making multiple walks in the same circular direction during infant unsupervised activity.

The similar walker assembly is presented in the U.S. Pat. No. 9,924,807. The walker comprises the stationary walker assembly, including a stationary base assembly, a first track, a second track, and a yoke assembly. The first track is configured to be connectable to the stationary base assembly, and also configured to be spaced apart from the stationary base assembly once the first track is connected to the stationary base assembly. The first track is positioned above the stationary base assembly once the first track is connected to the stationary base assembly. The second track is connected to the stationary base assembly, and is also configured to be spaced apart from the stationary base assembly once the second track is connected (to the stationary base assembly. This is done in such a way that the second track is positioned above the stationary base assembly once the second track is connected to the stationary base assembly. The first track and the second track 1are spaced apart from each other once the first track and the second track are connected to the stationary base assembly. The first track and the second track, in combination, form a walking path between the first and second tracks. The yoke assembly is configured to couple to the first track and the second track. The yoke assembly is also configured to receive and support the baby. The yoke assembly facilitates support of the baby relative to the stationary base assembly while the baby walks along the stationary base assembly. A technical effect of the above arrangement is that the stationary walker assembly, in use, permits the baby to walk along the stationary base assembly, and whereby the baby is not permitted to walk along the floor or the ground (since the stationary base assembly is placed on the ground or the floor).

The yoke assembly is also configured to be located between the first track and the second track. The yoke assembly is also configured to slidably engage with the first track and the second track, and the yoke assembly is slidable relative to the first track and the second track once the yoke assembly is slidably engaged with the first track and the second track, because the yoke assembly confines the movement of the baby along a predetermined walking path—the stationary walker assembly.

The first track also includes a first handrail configured to be touched by the hand (hands) of the baby, once baby is received in, and is supported by, the yoke assembly. The second track includes a second handrail configured to be touched by the hand (hands) of the baby, once baby is received in, and is supported by, the yoke assembly. The stationary walker assembly further includes at least one column assembly. The column assemblies are configured to extend between the first track and the stationary base assembly, and the column assemblies are configured to connect the first track to the stationary base assembly. The column assemblies are configured to extend vertically. The column assemblies are also connect the second track to the stationary base assembly. The yoke assembly 110 is configured to surround the waist area of the baby. The yoke assembly is coupled to a receiver assembly (also called a holder or a suspended fabric seat).

The receiver assembly can be rotatable relative to the yoke assembly. The yoke assembly is also configured to permit the hands of the baby to touch (contact) the first track and the second track once the baby is received and is supported by the yoke assembly. The walking surface of the stationary base assembly includes a central base section. The stationary base assembly defines an outer peripheral edge that is spaced apart from the central base section of the stationary base assembly. The stationary base assembly defines (includes) an outer peripheral edge that is spaced apart from the central base section of the stationary base assembly. The first track is positioned above the central base section of the stationary base assembly. The first track and the second track each forms a curved shape (a circular shape), and the first track is positioned concentrically relative to the second track, thereby providing a circular walking path for the baby walking along.

Such walker assemblies are complex, expensive, require laborious assembly work, and significantly limits the infant's walking ability and even can be dangerous for infants, because they may lead the infant to the head spinning effect by making multiple walks in the same circular direction during infant unsupervised activity.

All known devices, described hereinabove, do not provide active assistance for baby's balancing and motor coordination learning.

SUMMARY

In view of the foregoing disadvantages inherent in the known prior art, the present invention provides many advantages of the improved device for baby walking and balancing assistance. Illustratively in general, the improved device for baby walking and balancing assistance comprises two main portions (a pair of portions): a right foot portion and a left foot portion, a right foot shoe and a left foot shoe. The shoes can be of any reasonable kind, but not dangerous for the baby health, and for example, such as the slip-on type of boots from the soft elastic material. Also such boots preferably can be manufactured using an injection molding (not shown) of the shoes' soles into the upper surfaces of the right and left baseplates or the soles (not shown) of the right shoe and left shoe are rigidly connected (for example, by screws or by glue) to the upper surfaces of the right and left baseplates respectively.

Additionally to the right baseplate and right shoes, the right portion of the device for baby walking and balancing assistance also includes a front edge of the right baseplate, a rear edge of the right baseplate, a right side edge of the right baseplate and a left side edge of the right baseplate, and additionally to the left baseplate and left shoes, the left portion of the device for baby walking and balancing assistance also includes a front edge of the right baseplate, a rear edge of the right baseplate, a right side edge of the right baseplate and a left side edge of the right baseplate.

The lower surface of the right baseplate of the right portion and lower surface of the left baseplate of the left portion can preferably be slightly rough in order to prevent the baby's sliding steps, while the upper surface of the right baseplate of the right portion and upper surface of the left baseplate of the left portion can be of the shiny pleasant condition.

The right shoe is located closer to the left edge of the right portion of the device for baby walking and balancing assistance, and that the left shoe is located closer to the right edge of the right portion of the device for baby walking and balancing assistance. Such shoes locations are provided for baby's convenient steps.

The right shoe and left shoe of the device for baby walking and balancing assistance can have some decorations (not shown), e.g., such as animal heads (not shown) or if permitted some famous animation characters (not shown) or sound-making toys (not shown), etc.

The supporting strips instead of the shoes (boots) can be used. The lateral supporting strip and the heel supporting strip for the right portion, and the lateral supporting strip and the heel supporting strip for the left portion can be used to hold the baby feet. The supporting strips can be manufactured from the soft flexible elastic material, for example, such as Teflon, nylon, polystyrene-type, etc., and any equivalent thereof, and the Velcro locks or any other suitable strip locking member (element) can be used too.

The adult guardian/trainer (e.g., parents, babysitters) can provide the direct aid and support during baby's first steps in the walking and balancing activity learning. It is also preferable to provide supervision and active assistance for baby during his/her first steps, but any and all suitable and safety baby walkers can be additionally used as an aid for baby's walking and balancing exercises instead of the adult assistant(s). The use of the walker's fabric seat in the traditional form of trousers, wherein the right portion and left portion of the disclosed improved device for baby walking and balancing assistance are received by the baby's feet. The fabric seat in the form of loosen (relaxed) soft material pants (fabric pants) respectively coupled with the right and left portions of the disclosed improved device for baby walking and balancing assistance can be used too.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended Claims.

There are many advantages of the improved device for baby walking and balancing assistance, one of which is: the improved device for baby walking and balancing assistance does not include any complex and expensive mechanisms. The improved device for baby walking and balancing assistance can be conveniently used for the elderly or ill persons after brain medical surgical treatments, etc.

With respect to the above description then, it is to be realized that the optimum dimensional relationships (scale) for the parts of the invention, to include variations in size (scale), materials, configurations, shape, form, function and manner of operation, assembly and use, are deemed readily apparent and obvious to one skilled in the art, and all equivalent relationships to those illustrated in the drawings and described in the specification are intended to be encompassed by the present invention.

Any and all additional modifications and improvements of the present invention may also be apparent to those of ordinary skill in the art. Thus, the particular combination of parts/components/ members/portions described and illustrated herein is intended to represent only certain embodiments of the present invention, and is not intended to serve as limitations of alternative devices within the spirit and scope of the invention.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

Additional features of the present disclosure will become apparent to those skilled in the art upon consideration of illustrative embodiments exemplifying the best mode of carrying out the disclosure as presently perceived.

BRIEF DESCRIPTION OF THE DRAWING

In order that the invention and the manner in which it is to be performed can be more clearly understood, embodiments thereof will be described by way of example with reference to the attached drawings, the detailed description of which particularly refers to the accompanying figures in which.

THE DRAWING REFERENCE NUMERALS

1—a device for baby walking and balancing assistance;
2—a right foot portion (right portion);
3—a left foot portion (left portion);
4—a right foot baseplate (right baseplate);
5—a left foot baseplate (left baseplate);
6—a right foot shoe (right shoe);
7—a front edge of the right baseplate 4;
8—a rear edge of the right baseplate 4;
9—a right side edge of the right baseplate 4;
10—a left side edge of the right baseplate 4;
11—a left foot shoe (left shoe);
12—a front edge of the left baseplate 5;
13—a rear edge of the left baseplate 5;
14—a right side edge of the left baseplate 5;
15—a left side edge of the left baseplate 5;
16—a right semicircular edge of the right baseplate 4;
17—a left semicircular edge of the left baseplate 5;
18—a lower surface of the right baseplate 4;
19—a lower surface of the left baseplate 5;
20—an upper surface of the right baseplate 4;
21—an upper surface of the left baseplate 5;
22—a lateral supporting strip of the right portion 2;
23—a heel supporting strip of the right portion 2;
24—a lateral supporting strip of the left portion 3;
25—heel supporting strip of the left portion 3;
26—a fabric seat;
27—a fabric pants;
28-28—a vertical lateral cross-section of the right portion 2;
29-29—a vertical lateral cross-section of the left portion 3;
30-30—a vertical longitudinal cross-section of the right (left) portions;
31—a child (baby).

DETAILED DESCRIPTION

A device for baby walking and balancing assistance 1 in accordance with the present disclosure, is shown in FIGS. 1-8. According to FIGS. 1 and 2, the device for baby walking and balancing assistance 1 comprises two main portions (a pair of portions): a right foot portion 2 (further for simplification can be called as "right portion") and a left foot portion 3 (further for simplification can be called as "left portion").

Figure 1:
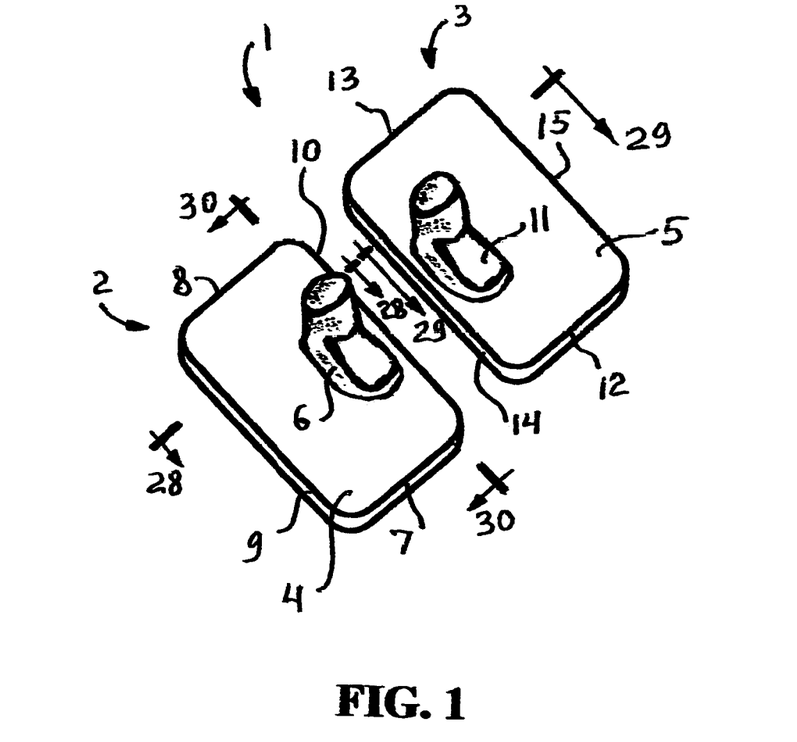
FIG. 1 is a simplified spatial view of the right portion of the device for baby walking and balancing assistance with the shoes.
Figure 2:
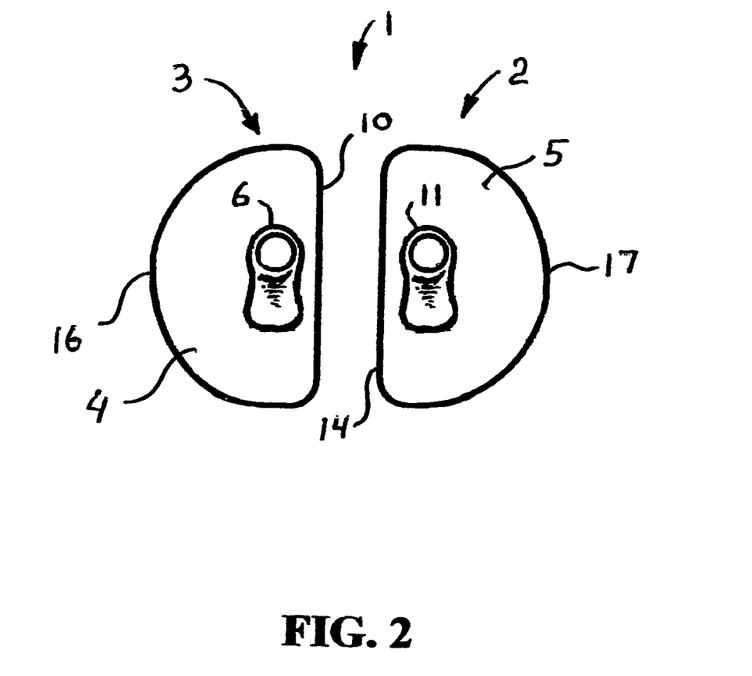
FIG. 2 is a simplified generalized top view of another variant of configuration of the device for baby walking and balancing assistance with the shoes.

FIGS. 1 and 2 depict the device for baby walking and balancing assistance 1, wherein a right foot baseplate 4 (further for simplification can be called as "right baseplate") and a left foot baseplate 5 (further for simplification can be called as "left baseplate") are represented by the different geometrical configurations of the right 4 and left 5 baseplates. In FIG. 1 the right 4 and left 5 baseplates are presented, as an example, of rectangular form (the square form can be used too), but in FIG. 2 the right 4 and left 5 baseplates are presented, as an example, in the shape (form) of combination of the straight edges 10 and 15 with the semicircular edges 16 and 17 respectively: semicircular edge 16 for the right portion 2 and semicircular edge 17 for the left portion 3, as shown in FIG. 2. The presented configurations of the right 4 and left 5 baseplates are given as the examples and are not limited to these representations. The configurations of the right 4 and left 5 baseplates can be of any reasonable geometric forms, shapes, sizes, and dimensions.

FIG. 1 presents the simplified spatial view of the right portion 2 and left portion 3 of the device for baby walking and balancing assistance 1 with a right foot shoe 6 (further for simplification can be called as "right shoe") and a left foot shoe 11 (further for simplification can be called as "left shoe"). The shoes can be of any reasonable kind, but not dangerous for the baby health, and for example, such as the slip-on type of boots from the soft elastic material. Also such boots preferably can be manufactured using an injection molding (not shown) of the shoes (e.g., of the shoes' soles) into the upper surfaces 20 and 21 of the right 4 and left 5 baseplates respectively or the soles (not shown) of the right shoe 6 and left shoe 11 can be rigidly connected (for example, by screws/not shown/or by glue/not shown/) to the upper surfaces 20 and 21 respectively.

Referring to FIG. 1, additionally to the right baseplate 4 and right shoes 6, the right portion 2 of the device for baby walking and balancing assistance 1 also includes a front edge 7 of the right baseplate 4, a rear edge 8 of the right baseplate 4, a right side edge 9 of the right baseplate 4 and a left side edge 10 of the right baseplate 4. And additionally to the left baseplate 5 and left shoes 11, the left portion 3 of the device for baby walking and balancing assistance 1 also includes a front edge 12 of the right baseplate 5, a rear edge 13 of the right baseplate 5, a right side edge 14 of the right baseplate 5 and a left side edge 15 of the right baseplate 5. The right shoe is rigidly connected to the upper surface 20 of the right baseplate 4 at a first distance spaced apart from the right side edge and at a second distance spaced apart from the left side edge of said right baseplate, where the first distance is greater than the second distance, and the left shoe is rigidly connected to the upper surface 21 of the left baseplate 5 at a first distance spaced apart from the left side edge and at a second distance spaced apart from the right side edge of said left baseplate, where the first distance is greater than the second distance. The baseplates 4 and 5 are generally flat, as shown in FIG. 1. The edges 7-10 and 12-15 should be not sharp for safety, therefore, can be rounded in their shape (not shown in FIG. 1, but shown in FIGS. 3-5) or alike. Also, edges 7-10 and 12-15 can be configured slightly upward, as it is shown in FIGS. 3-5.

Figure 3:
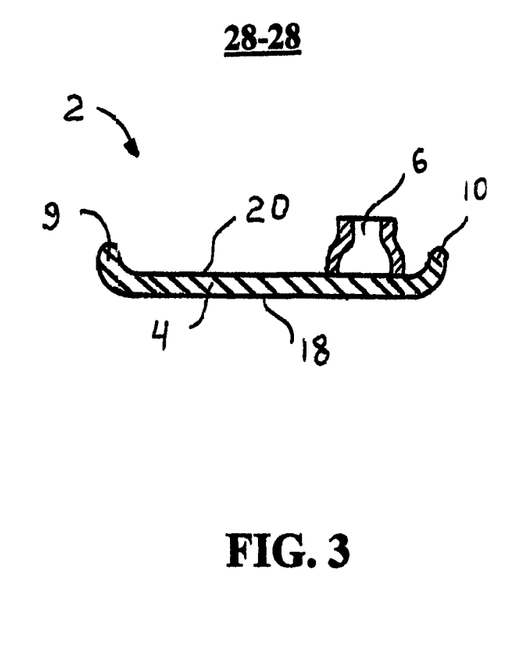
FIG. 3 is a simplified drawing of the vertical lateral cross-section 28-28 of the right portion of the device for baby walking and balancing assistance with the shoe.
Figure 4:
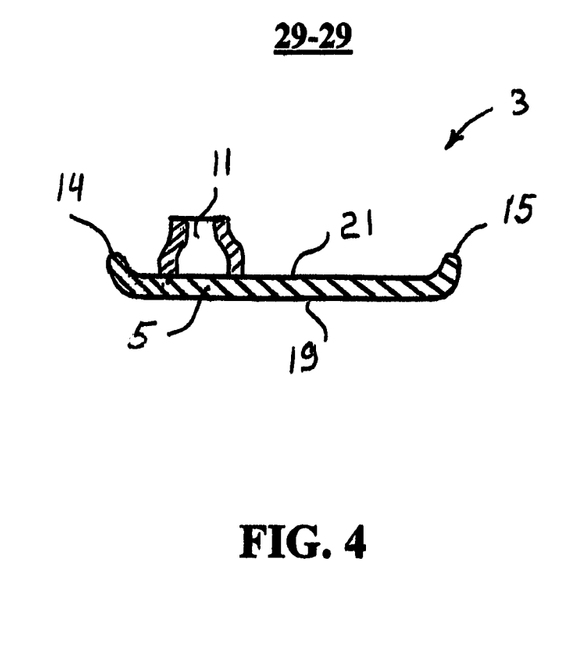
FIG. 4 is a simplified drawing of the vertical lateral cross-section 29-29 of the left portion of the device for baby walking and balancing assistance with the shoe.

According to vertical lateral cross-sections in FIGS. 3 and 4, a lower surface 18 of the right baseplate 4 of the right portion 2 and a lower surface 19 of the left baseplate 5 of the left portion 3 can preferably be slightly rough in order to prevent the baby's sliding steps, while the upper surface 20 of the right baseplate 4 of the right portion 2 and upper surface 21 of the left baseplate 5 of the left portion 3 can be of the shiny pleasant condition.

Figure 5:
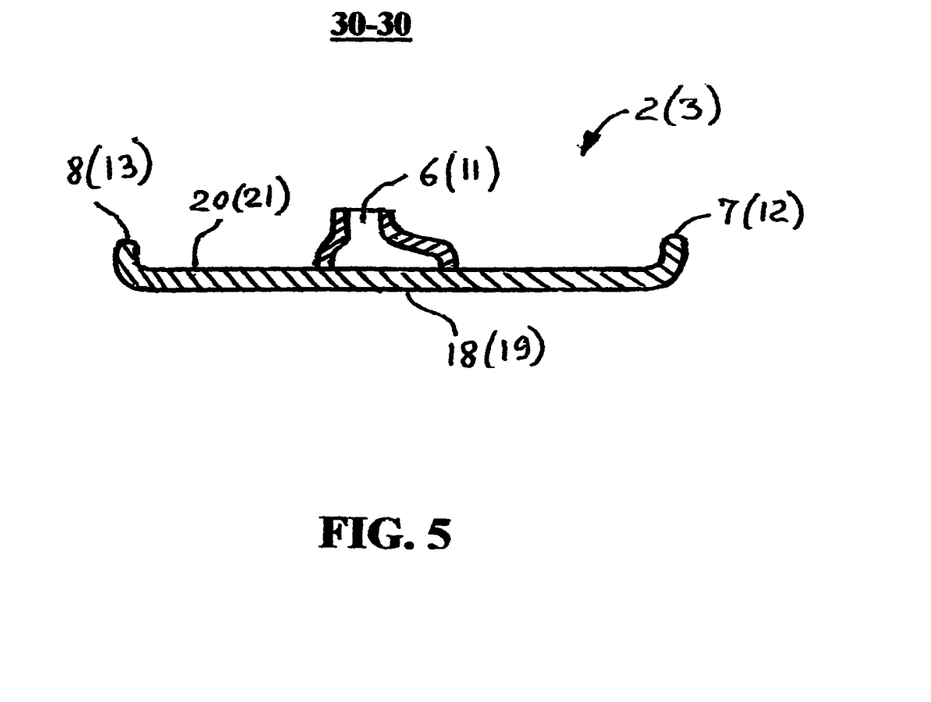
FIG. 5 is a simplified drawing of the vertical longitudinal cross-section 30-30 of the right portion of the device for baby walking and balancing assistance with the shoe.

FIG. 5 illustrates the vertical longitudinal cross-section of the right portion 2, but the analogous vertical longitudinal cross-section of the left portion 3 (not shown) will depict the same view, therefore, the drawing reference numerals of the analogous components for the left portion 3 are given in the parentheses in FIG. 5.

In FIGS. 1, 2, 3 and 4 is shown that the right shoe 6 is located closer to the left edge 10 of the right portion 2 of the device for baby walking and balancing assistance 1, and that the left shoe 11 is located closer to the right edge 15 of the right portion 3 of the device for baby walking and balancing assistance 1. Such shoes 6 and 11 locations are provided for baby's convenient steps.

The right shoe 6 and left shoe 11 of the device for baby walking and balancing assistance can have some decorations (not shown), e.g., such as animal heads (not shown) or if permitted some famous animation characters (not shown) or sound-making toys (not shown), etc.

Figure 6:
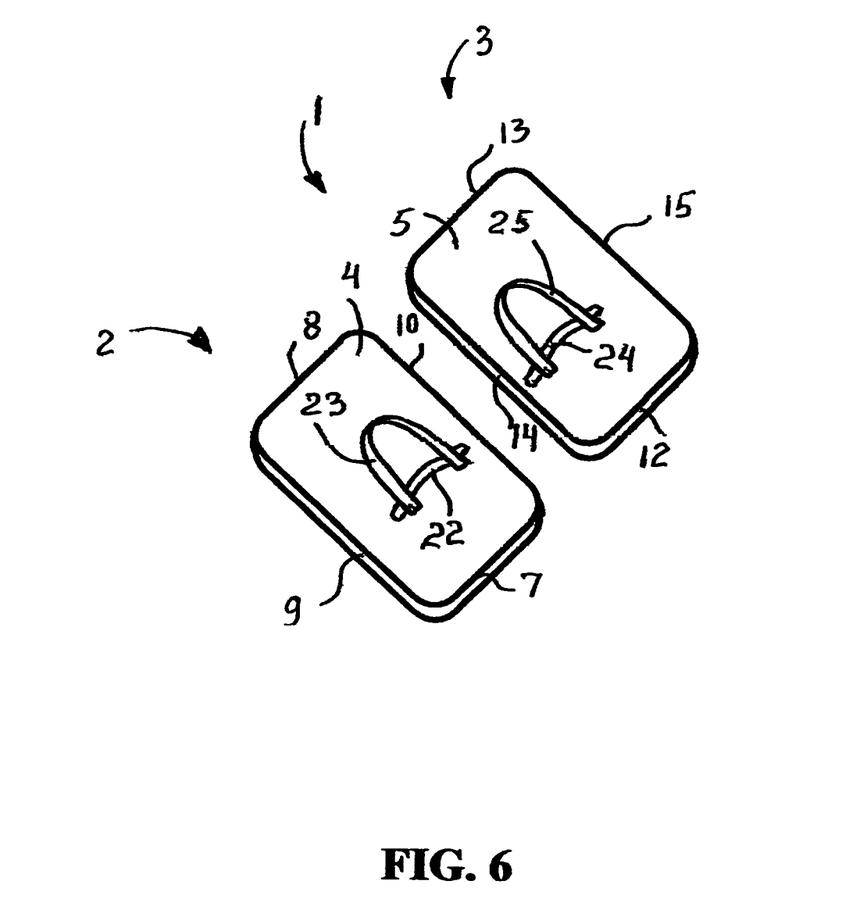
FIG. 6 is a simplified spatial view of the right portion of the device for baby walking and balancing assistance with the supporting strips.

FIG. 6 demonstrate the possibility of the use of the supporting strips instead of the shoes (boots). The lateral supporting strip 22 and the heel supporting strip 23 for the right portion 2, and the lateral supporting strip 24 and the heel supporting strip 25 for the left portion 3 can be used to hold the baby feet. The supporting strips 22-25 can be manufactured from the soft flexible elastic material, for example, such as Teflon, nylon, etc., and any equivalent thereof, and the Velcro locks or any other suitable strip locking member (element) can be used for control of the reasonable tightness of the strips to the baby's feet.

The free ends of the strips 22 and 23 (the strip ends not intended to be coupled with the locks) are rigidly connected to the upper surface 20 of the right baseplate 4 at a first distance spaced apart from the right side edge and at a second distance spaced apart from the left side edge of said right baseplate, where the first distance is greater than the second distance, and the free ends of the strips 24 and 25 (the strip ends not intended to be coupled with the locks) are rigidly connected to the upper surface 21 of the left baseplate 5 at a first distance spaced apart from the left side edge and at a second distance spaced apart from the right side edge of said left baseplate, where the first distance is greater than the second distance.

Figure 7:
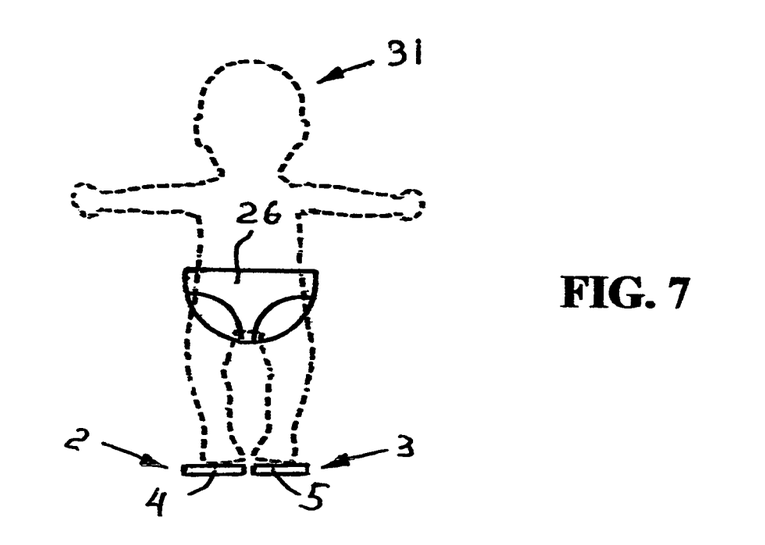
FIG. 7 is a simplified illustration of the fabric seat.
Figure 8:
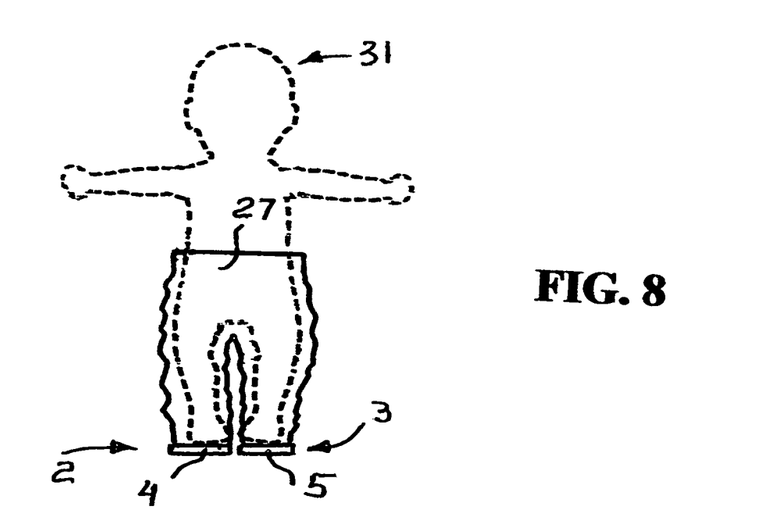
FIG. 8 is a simplified illustration of the fabric pants.

The adult guardian/trainer (e.g., parents, babysitters) can provide the direct aid and support during baby's first steps in the walking and balancing activity learning. It is now well known from the literature and other sources (e.g., "WikipediA"), that pedobarography, researching pressure fields acting between the plantar surface of the foot and a supporting surface of the sole (underside area of the foot), provides a wide range of applications including infant's biomechanics (balancing, motor coordination) and infant's posture and gait biometrics. It also well known that practically only two small areas of the sole are responsible for balancing and motor coordination, therefore, it is the important need to increase the flat area of the sole of the infant's little foot at the beginning of the balance learning. It is also preferable to provide supervision and active assistance for baby during his/her first steps, but any and all suitable and safety baby walkers can be additionally used as an aid for baby's walking and balancing exercises instead of the adult assistant(s). FIG. 7 demonstrates the use of the walker's fabric seat 26 (also called a holder or suspended child /baby, infant/fabric seat, etc.) in the traditional form of trousers, wherein the right portion 2 and left portion 3 of the disclosed improved device for baby walking and balancing assistance 1 are received by the baby's feet, and FIG. 8 illustrates the possibility of the use of the fabric seat in the form of loosen (relaxed) soft material pants (fabric pants) 27 respectively coupled with the right 2 and left 3 portions of the disclosed improved device for baby walking and balancing assistance 1, the soft elastic material boots (shoes) or supporting strips are received by the respective baby's foot. The fabric seat 26 or fabric pants 27 devised and utilized for the purpose of supporting a child (baby) 31 in a seat/pant so as the child 31 can walk without adult help. The baby seat 26 and the baby pants 27 can be interchangeable in the baby's walker (not shown).

The fabric pants 27 is configured to receive and to support the baby relative to the movable base (not shown) or non-movable stationary base (not shown) in such a way that the baby with the put-on right portion 2 and left portion 3 touches the walking surface. More specifically, the lower surface 18 of the right baseplate 4 and lower surface 19 of the left baseplate 5 touches the walking surface (e.g., floor/not shown/, carpet/not shown/).

The sizes (areas) of the baseplates 4 and 5 in FIGS. 1-6 are shown in the enlarged (increased) dimensions in comparison to the shoes 6 and 11 dimensions and to the supporting strips 22-25 in order to demonstrate all features of the invention and all relative drawing reference numerals. The dimensions (areas) of the baseplates 4 and 5 are preferably only slightly bigger then the foot of the baby, for example, as it is in simplified manner illustrated in FIGS. 7 and 8, wherein the sizes (widths) of the baseplates 4 and 5 and baby underside areas of the feet (as well as the width of the shoes/not shown in FIGS. 7 and 8/) are comparable (commensurable). Preferably, the lengths of the baseplates 4 and 5 are slightly bigger than the lengths of the soles of the shoes 6 and 11 respectively, and the widths of the baseplates 4 and 5 are slightly bigger than the widths of the soles of the shoes 6 and 11 respectively.

It is understood, that any suitable safe from hazards, soft, flexible fabric material and/or synthetic material, and any equivalent thereof can be used. For example, the baseplates 4 and 5 can be preferably manufactured from any non-flexible material, but insignificantly flexible (slightly bendable, not rigid) material can be used too. Also, the right 6 and left 11 shoes, supporting strips 22-25, and right 4 and left 5 baseplates can preferably be of the light weight material.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

There are many advantages of the improved device for baby walking and balancing assistance, one of which is: the improved device for baby walking and balancing assistance does not include any complex and expensive mechanisms. The improved device for baby walking and balancing assistance can be conveniently used for the elderly or ill persons after brain medical surgical treatments, etc.

With respect to the above description then, it is to be realized that the optimum dimensional relationships (scale) for the parts of the invention, to include variations in size (scale), materials, configurations, shape, form, function and manner of operation, assembly and use, are deemed readily apparent and obvious to one skilled in the art, and all equivalent relationships to those illustrated in the drawings and described in the specification are intended to be encompassed by the present invention.

Any and all additional modifications and improvements of the present invention may also be apparent to those of ordinary skill in the art. Thus, the particular combination of parts/components/ members/portions described and illustrated herein is intended to represent only certain embodiments of the present invention, and is not intended to serve as limitations of alternative devices within the spirit and scope of the invention.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

Additional features of the present disclosure will become apparent to those skilled in the art upon consideration of illustrative embodiments exemplifying the best mode of carrying out the disclosure as presently perceived.

The invention claimed is:

1. A device for baby walking and balancing assistance, comprising:
   a right portion comprising:
      a right slip-on boot or pair of supporting strips configured to hold a right foot of said baby:
      a right baseplate having a front edge, a rear edge, a right side edge, and a left side edge,
      wherein said right slip-on boot or said pair of supporting strips is located on an upper surface of said right baseplate at a first distance spaced apart from the right side edge and at a second distance spaced apart from the left side edge of said right baseplate, where the first distance is greater than the second distance,
      wherein a sole of said right slip-on boot or free ends of said pair of supporting strips are rigidly coupled to said upper surface of said right baseplate,
      wherein an area of said front edge of said right baseplate and an area of said rear edge of said right baseplate are slightly bent upward; and
   a left portion comprising:
      a left slip-on boot or pair of supporting strips configured to hold a left foot of said baby:
      a left baseplate having a front edge, a rear edge, a right side edge, and a left side edge,
      wherein said left slip-on boot or pair of supporting strips is located on an upper surface of said left baseplate at a first distance spaced apart from the left side edge and at a second distance spaced apart from the right side edge of said left baseplate, where the first distance is greater than the second distance,
      wherein a sole of said left slip-on boot or free ends of said pair of supporting strips are rigidly coupled to said upper surface of said left baseplate, and
      wherein an area of said front edge of said left baseplate and an area of said rear edge of said left baseplate are slightly bent upward.

2. The device for baby walking and balancing assistance of claim 1, wherein said device for baby walking and balancing assistance includes a baby walker comprising a pant seat for holding of said baby, a pant right leg coupled with said pant seat of said baby walker, and a pant left leg coupled with said pant seat of said baby walker;
   wherein said upper surface of said right baseplate is coupled with a bottom of said pant right leg of said baby walker, and said upper surface of said left baseplate is coupled with a bottom of said pant left leg of said baby walker.

* * * * *